M. RAMASSOT.
THERMOSTAT.
APPLICATION FILED MAR. 19, 1909.
961,014.
Patented June 7, 1910.
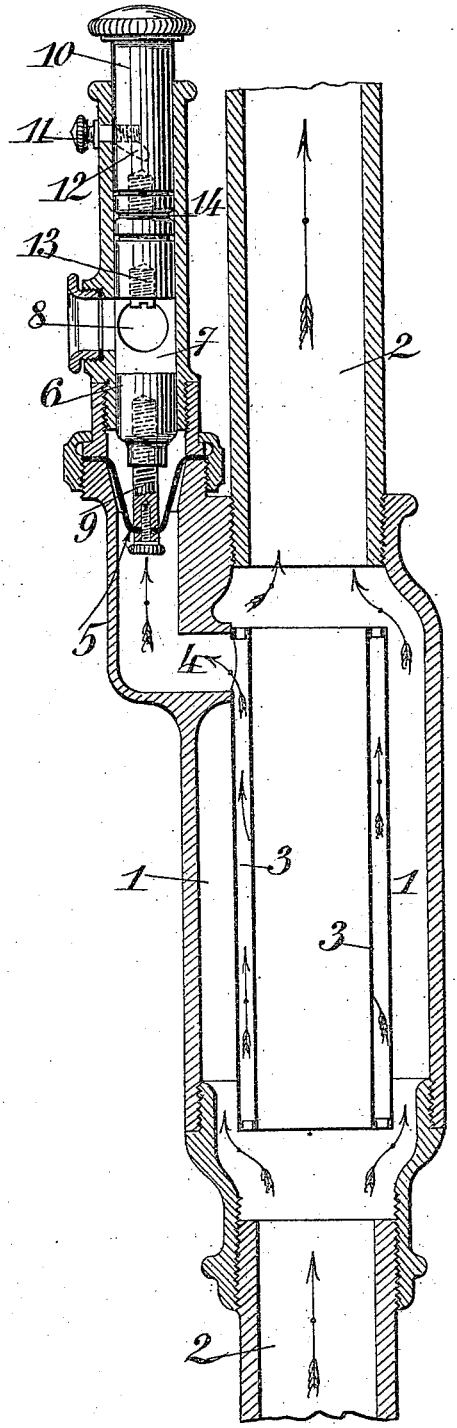
WITNESSES
W. P. Burke
Edward D. Spring
INVENTOR
Marius Ramassot

UNITED STATES PATENT OFFICE.

MARIUS RAMASSOT, OF LYON, FRANCE.

THERMOSTAT.

961,014.   Specification of Letters Patent.   Patented June 7, 1910.

Application filed March 19, 1909. Serial No. 484,421.

*To all whom it may concern:*

Be it known that I, MARIUS RAMASSOT, a citizen of the French Republic, residing at Lyon, in France, have invented certain new and useful Improvements in Thermostats, of which the following is a specification.

This invention relates to thermostats for use in connection with gas-stoves or heaters, and is based on the use of a liquid which expands under the action of heat and acts on a piston or the like for the purpose of regulating or closing an orifice or passage through which gas flows to the burner. The receptacle containing the liquid, for example olive-oil, may be placed either in the atmosphere, the temperature of which is to be regulated, or in an atmosphere or liquid the temperature of which is equal or proportional to the temperature of atmosphere to be regulated.

Referring to the accompanying drawing in which is shown an illustrative embodiment of this invention water from the heating pipes flows through the conduit 2, the enlarged part 1 of which contains an annular receptacle 3 of thin metal. The receptacle 3 communicates with a chamber 4 closed at the top by an elastic membrane 5, which is connected by a rod 9 to a piston-valve 6 in a tube 7 outside the chamber 4. The receptacle 3 and chamber 4 contain expansible liquid, for example olive-oil. Expansion of this oil, due to heating of the receptacle 3 by the water, causes the oil to act on the diaphragm and lift the piston 6. The piston is adapted to throttle and close an orifice 8 through which gas flows to the gas-stove. The piston is adjustable on the rod 9, to allow of regulating its action. The orifice 8 is also regulatable by means of a piston 10 in the upper part of the tube 7. A screw 11 screwed into the side of the piston 10 traverses a helicoidal slot 12 in the tube 7, so that rotation of the piston 10, which can be effected by hand, causes the piston to ascend or descend, for the purpose of more or less covering the orifice 8. The piston 10 is, however, too short to entirely close the said orifice, and a screw 13, with protruding head, screwed into its lower face, prevents complete closure of the said orifice by the piston 6. The piston 10 is made tight by means of a leather packing 14, to prevent escape of gas.

The apparatus is applicable to all systems of heating by gas, the essential condition for its proper working being that the expansible liquid is kept at a temperature as nearly as possible equal or proportional to the temperature of the room to be regulated.

What I claim as my invention and desire to secure by Letters Patent of the United States is:—

1. In combination with a conduit and means for passing a heating fluid therethrough, a chamber in said conduit, an expansible liquid in said chamber, a tube connected with said chamber, a gas conduit passing through said tube, a piston in said tube adapted to be moved by action of the liquid so as to control the gas conduit, a second piston in said tube having one end projecting therefrom, said second piston having a curved slot therein, a lug on the tube projecting into the said slot, whereby the second piston may be moved toward and from the first piston so as to control the movement thereof, substantially as described.

2. In combination with a conduit and means for passing a heated fluid therethrough, of a chamber in said conduit, an expansible liquid in said chamber, a tube connected with said chamber, a gas conduit passing through said tube, a diaphragm in said tube, a piston connected with said diaphragm so as to be moved by the action of the liquid on the diaphragm to control the gas conduit, and manually operated means for controlling the extent of movement of said piston.

3. In combination with a conduit and means for passing a heated fluid therethrough, of a chamber in said conduit, an expansible liquid in said chamber, a tube connected with said chamber, a gas conduit passing through said tube, a diaphragm in said tube, an adjustable piston connected with said diaphragm so as to be moved by the action of the liquid on the diaphragm to control the gas conduit, and manually operated means for controlling the extent of movement of said piston.

4. The combination with a conduit and means for passing heated fluid therethrough, of a chamber in said conduit, an expansible liquid in said chamber, a tube connected with said chamber, a gas conduit passing through the tube, a diaphragm in said tube adapted to be acted on by the action of the liquid, a piston connected with said diaphragm and adapted to control the gas conduit, and an upper piston in the tube located above the gas conduit and having one end projecting from the tube so as to be moved by hand, and a stop on said piston adapted to engage with the first mentioned piston to control the extent of movement of the same.

In witness whereof I have signed this specification in the presence of two witnesses.

MARIUS RAMASSOT.

Witnesses:
GASTON JEANNIAUX,
MARIN VACHON.